(12) United States Patent
Lam et al.

(10) Patent No.: US 12,518,032 B1
(45) Date of Patent: Jan. 6, 2026

(54) SYSTEM AND METHOD USING TRUSTED AUTHORIZATION MECHANISM BASED ON POLYNOMIAL COMMITMENT MULTIPLE ACCESS FOR DATA EXCHANGE

(71) Applicant: Hong Kong Applied Science and Technology Research Institute Company Limited, Hong Kong (HK)

(72) Inventors: Peifung Eric Lam, Hong Kong (HK); Zhihua Xiao, Hong Kong (HK); Cailing Cai, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 54 days.

(21) Appl. No.: 18/764,409

(22) Filed: Jul. 5, 2024

(51) Int. Cl.
  *H04L 29/06* (2006.01)
  *G06F 21/60* (2013.01)

(52) U.S. Cl.
  CPC .................. *G06F 21/606* (2013.01)

(58) Field of Classification Search
  None
  See application file for complete search history.

(56) References Cited

U.S. PATENT DOCUMENTS

| | | |
|---|---|---|
| 10,171,241 B2 | 1/2019 | Xu et al. |
| 10,873,452 B1 | 12/2020 | Zhou et al. |
| 11,658,984 B2 | 5/2023 | Gujarathi et al. |
| 12,099,997 B1* | 9/2024 | Hoffberg ............. G06Q 20/065 |
| 12,294,654 B1* | 5/2025 | Greco .................. H04L 9/3218 |

(Continued)

FOREIGN PATENT DOCUMENTS

| | | |
|---|---|---|
| CN | 116975937 A | 10/2023 |
| CN | 118037446 A | 5/2024 |

(Continued)

OTHER PUBLICATIONS

Prabal Banerjee, Dushyant Behl, Palanivel Kodeswaran, Chaitanya Kumar, Sushmita Ruj, Sayandeep Sen, and Dhinakaran Vinayagamurthy. 2023. Accelerated Verifiable Fair Digital Exchange. Distrib. Ledger Technol. 2, 3, Article 18 (Sep. 2023), 24 pages. https://doi.org/10.1145/3596448 (Year: 2023).*

(Continued)

*Primary Examiner* — Jeffery L Williams
(74) *Attorney, Agent, or Firm* — Idea Intellectual Limited; Sam T. Yip

(57) ABSTRACT

A system using trusted authorization mechanism based on PCMA for data exchange is provided. The system includes a data owner module, a data user module, and a data exchange module. The data owner module encrypts a data collection using an encryption key and generates an identifier, hash value of each data, and a ciphertext of each dataset. The data user module submits at least one request to the data owner module for accessing and evaluating datasets. The data owner module authorizes the datasets of the data collection. The data exchange module generates a single PCMA token based on the user's identity, the identifiers of the datasets, and the hash values of the authorized datasets. The data exchange module constructs the PCMA token using a polynomial commitment mechanism, allowing it to maintain a constant size regardless of the number of authorized data.

20 Claims, 8 Drawing Sheets

(56) References Cited

U.S. PATENT DOCUMENTS

| | | | |
|---|---|---|---|
| 12,361,161 B2* | 7/2025 | Innanje | G16H 30/20 |
| 2013/0340093 A1* | 12/2013 | Reinertsen | G06F 21/34 726/28 |
| 2019/0165943 A1* | 5/2019 | Chari | H04L 9/3221 |
| 2019/0297060 A1* | 9/2019 | Iverson | G06Q 10/02 |
| 2020/0169407 A1* | 5/2020 | Wei | H04L 63/10 |
| 2021/0089676 A1* | 3/2021 | Ford | H04L 9/0825 |
| 2022/0394327 A1* | 12/2022 | Sampson | H04L 67/06 |
| 2023/0058219 A1 | 2/2023 | Vinayagamurthy et al. | |
| 2023/0120897 A1* | 4/2023 | Kozlowski, III | H04L 9/32 705/75 |
| 2023/0267220 A1 | 8/2023 | El Khiyaoui et al. | |
| 2023/0281583 A1* | 9/2023 | Jakobsson | G06Q 20/123 |
| 2023/0318837 A1* | 10/2023 | Oh | H04L 9/3218 713/168 |
| 2024/0020665 A1* | 1/2024 | Bakshi | G06Q 40/04 |
| 2024/0370865 A1* | 11/2024 | Bernardi | G06Q 20/36 |
| 2025/0094973 A1* | 3/2025 | Subramanian | G06F 21/6245 |
| 2025/0260577 A1* | 8/2025 | Greco | H04L 9/0637 |
| 2025/0265365 A1* | 8/2025 | Ramesh | G06F 21/6218 |

FOREIGN PATENT DOCUMENTS

| | | | | |
|---|---|---|---|---|
| CN | 118469564 A | * | 8/2024 | G06Q 50/06 |
| CN | 119384836 A | * | 1/2025 | |
| EP | 4221077 A1 | | 8/2023 | |
| JP | 2024045358 A | * | 4/2024 | H04L 9/3247 |
| WO | 2021139544 A1 | | 7/2021 | |

OTHER PUBLICATIONS

Jiaheng Zhang et al., "Polynomial Commitment with a One-to-Many Prover and Applications", 31st USENIX Security Symposium (USENIX Security 22), Aug. 2022, p. 2965-2982. (Year: 2022).*

J. Sun, X. Yao, S. Wang and Y. Wu, "Blockchain-Based Secure Storage and Access Scheme For Electronic Medical Records in IPFS," in IEEE Access, vol. 8, pp. 59389-59401, 2020, doi: 10.1109/ACCESS.2020.2982964. (Year: 2020).*

Yuguang Hu et al., "zkPoD: A Practical Decentralized System for Data Exchange", SECBIT Labs, Aug. 2019, pp. 1-37.

Mi Hyeon Jeon et al., "Blockchain-based fair and secure protocol for decentralized data trading", Journal of Internet Services and Information Security, Aug. 2022, vol. 12, No. 3, pp. 30-48.

Ertem Nusret Tas et al., "Atomic and Fair Data Exchange via Blockchain", Cryptology ePrint Archive, Mar. 2024.

Rui Song et al., "ZKDET: A Traceable and Privacy-Preserving Data Exchange Scheme based on Non-Fungible Token and Zero-Knowledge", 2022 IEEE 42nd International Conference on Distributed Computing Systems, Institute of Electrical and Electronics Engineers, Jul. 2022.

Xin Lu et al., "Trust-DETM: Distributed Energy Trading Model Based on Trusted Execution Environment", Mathematics, MDPI, 2023, vol. 11, Iss. 13, No. 2934, pp. 1-18.

H. Gunasinghe et al., "PrividEx: Privacy Preserving and Secure Exchange of Digital Identity Assets", WWWW '19. The World Wide Web Conference, Association for Computing Machinery, May 2019, pp. 594-604.

Aniket Kate et al., "Constant-Size Commitments to Polynomials and Their Applications", Advances in Cryptology—ASIACRYPT 2010, 16th International Conference on the Theory and Application of Cryptology and Information Security, 2010.

International Search Report and Written Opinion of corresponding PCT application No. PCT/CN2024/118254 mailed on Mar. 24, 2025.

* cited by examiner

US 12,518,032 B1

SYSTEM AND METHOD USING TRUSTED AUTHORIZATION MECHANISM BASED ON POLYNOMIAL COMMITMENT MULTIPLE ACCESS FOR DATA EXCHANGE

TECHNICAL FIELD

The present invention relates to data exchange technologies; and in particular to systems and methods using trusted authorization mechanism based on polynomial commitment multiple access (PCMA) for data exchange.

BACKGROUND

Today, data is considered as one of the most crucial production factors, along with human capital, land, and finance. Accordingly, data is increasingly regarded as a valuable commodity that people are willing to pay money for. In this regard, data users (e.g., buyers), data owners (e.g., sellers), and data exchange centers (e.g., exchanges) are the main entities of data markets.

However, for most data trades, a certain level of trust is needed. For example, sellers are concerned that valuable data can be easily replicated by buyers without paying for it. Additionally, before the purchase, a buyer would want to evaluate the data. As such, there is an issue regarding how to establish mutual trust to facilitate the data trade. Ideally, buyers could evaluate full data before payment. Sellers' data should not be leaked to prospective buyers before the transaction is completed.

Therefore, there is a need for an improved trusted authorization mechanism to simplify data privacy, authenticity and quality management, and facilitate smoother trading between buyers and sellers in data trades.

SUMMARY OF INVENTION

In accordance with a first aspect of the present invention, a system using a trusted authorization mechanism based on polynomial commitment multiple access (PCMA) for data exchange is provided. The system includes a data owner module, a data user module, and a data exchange module. The data owner module is electrically or wirelessly coupled for data communication with an owner terminal and is configured to encrypt a data collection comprising multiple datasets of the owner terminal using an encryption key and to generate an identifier, a hash value, and a ciphertext for each of the datasets. The data user module is electrically or wirelessly coupled for data communication with a user terminal and is configured to submit at least one request from the user terminal to the data owner module for accessing and evaluating the datasets. The data owner module is further configured to check the request from the data user module, authorizing at least one of the datasets of the data collection or rejecting any request without authorizing any one of the requested datasets of the data collection. The data exchange module is electrically or wirelessly coupled for data communication with a data exchange center and is configured to generate a single PCMA token based on the user's identity which is registered in the data exchange module, the identifiers of the datasets, the hash values of the authorized datasets, and ciphertext of the encryption key which is used to encrypt the data collection. The data exchange module constructs the PCMA token using a polynomial commitment mechanism, which allows it to maintain a constant size regardless of the number of data authorizations it represents. The data exchange module leverages a commitment algorithm of the polynomial commitment mechanism as a cryptographic protocol for the PCMA token, so as to ensure that any potentially sensitive raw information used to construct the PCMA token is free from feasibly deriving from it. The data exchange module is further configured to send the PCMA token to the data user module for submission by the user terminal when requesting for data evaluation.

In accordance with a second aspect of the present invention, a method using a trusted authorization mechanism based on PCMA for data exchange is provided. The method includes the steps as follows: encrypting, by a data owner module, a data collection comprising multiple datasets of an owner terminal by using an encryption key; generating, by the data owner module, an identifier, a hash value, and a ciphertext of each of the datasets; submitting, by a data user module, at least one request from a user terminal to the data owner module for evaluating the datasets; checking, by the data owner module, the request from the data user module and authorizing, by the data owner module, at least one of the datasets of the data collection or rejecting, by the data owner module, any request without authorizing any one of the requested datasets of the data collection; generating, by a data exchange module, a single PCMA token based on the user's identity, which is registered in the data exchange module, the identifiers of the datasets, the hash values of the authorized datasets, and a ciphertext of the encryption key which is used to encrypt the data collection; constructing, by the data exchange module, the PCMA token using a polynomial commitment mechanism, which allows it to maintain a constant size regardless of the number of data authorizations it represents, wherein the data exchange module leverages a commitment algorithm of the polynomial commitment mechanism as a cryptographic protocol for the PCMA token, so as to ensure that any potentially sensitive raw information used to construct the PCMA token is free from feasibly deriving from it; and sending, by the data exchange module, the PCMA token to the data user module for submission by the user terminal when requesting for data evaluation.

In the various embodiments of the present invention, the buyer obtains the evaluation results of the full data before payment, while the seller is assured that the data is not leaked to prospective buyers. Furthermore, to simplify data privacy management, the buyer only needs to submit one public token to access multiple data evaluations.

BRIEF DESCRIPTION OF DRAWINGS

Embodiments of the invention are described in more details hereinafter with reference to the drawings, in which.

DETAILED DESCRIPTION OF THE INVENTION

In the following description, systems and methods using trusted authorization mechanism based on polynomial commitment multiple access (PCMA) for data exchange and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
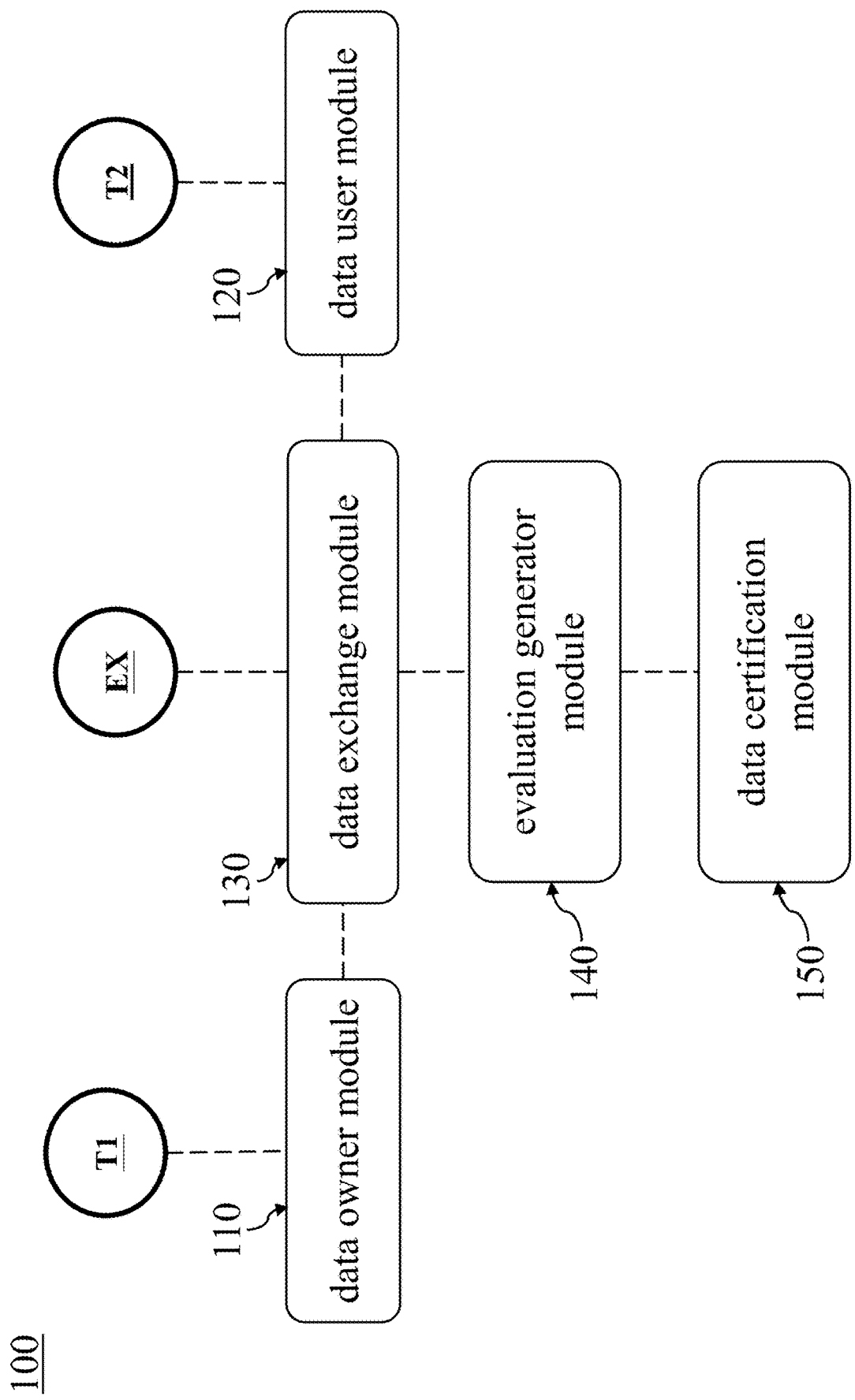
FIG. 1 depicts a schematic architecture of a system using a trusted authorization mechanism based on polynomial commitment multiple access (PCMA) according to one embodiment of the present invention.

Referring to FIG. 1 for the following description. The system 100 is created for data exchanges (or trades) between a buyer and a seller (also can be multiple buyers and multiple sellers) via an exchange center, and provides a platform based on a trusted authorization mechanism in combination with a single PCMA token, achieving trustworthiness, security, and user-friendliness.

Briefly, before the payment is made for the data exchange, the buyer obtains at least one evaluation result of the interested data and uses a single PCMA token to access and evaluate multiple datasets. Also, before the payment is made for the data exchange, the seller maintains data confidentiality, ensuring that no specific data profile is shown to the buyer. Then, after payment is made for the data exchange, the buyer is ensured to obtain the data that is the same as the evaluated one. In the transaction of data exchange, the PCMA token serves as a core to achieve the trusted authorization mechanism; further descriptions of the PCMA token and components of the system 100 are provided below.

The system 100 includes a data owner module 110, a data user module 120, a data exchange module 130, an evaluation generator module 140, and a data certification module 150. The data owner module 110 is electrically or wirelessly coupled for data communication with an owner terminal T1, such as an operatable interface for a seller, and is configured to carry out user instructions. The data user module 120 is electrically or wirelessly coupled for data communication with a user terminal T2, such as an operatable interface for a buyer, and is configured to carry out user instructions. The data exchange module 130 is electrically or wirelessly coupled for data communication with a data exchange center EX. In some embodiments, the data exchange center EX is built in the data exchange module 130, hence features or functions of the data exchange center EX are processes or executed by the data exchange module 130, which can serve as a web server interface of an exchange. The evaluation generator module 140 is configured to provide a trusted executed environment (TEE) enclave and perform an evaluation process during the transaction. The data certification module 150 is configured to deploy smart contracts for data certification.

These components are in communication with each other to complete a trusted authorization transaction for data exchange.

Figure 2:
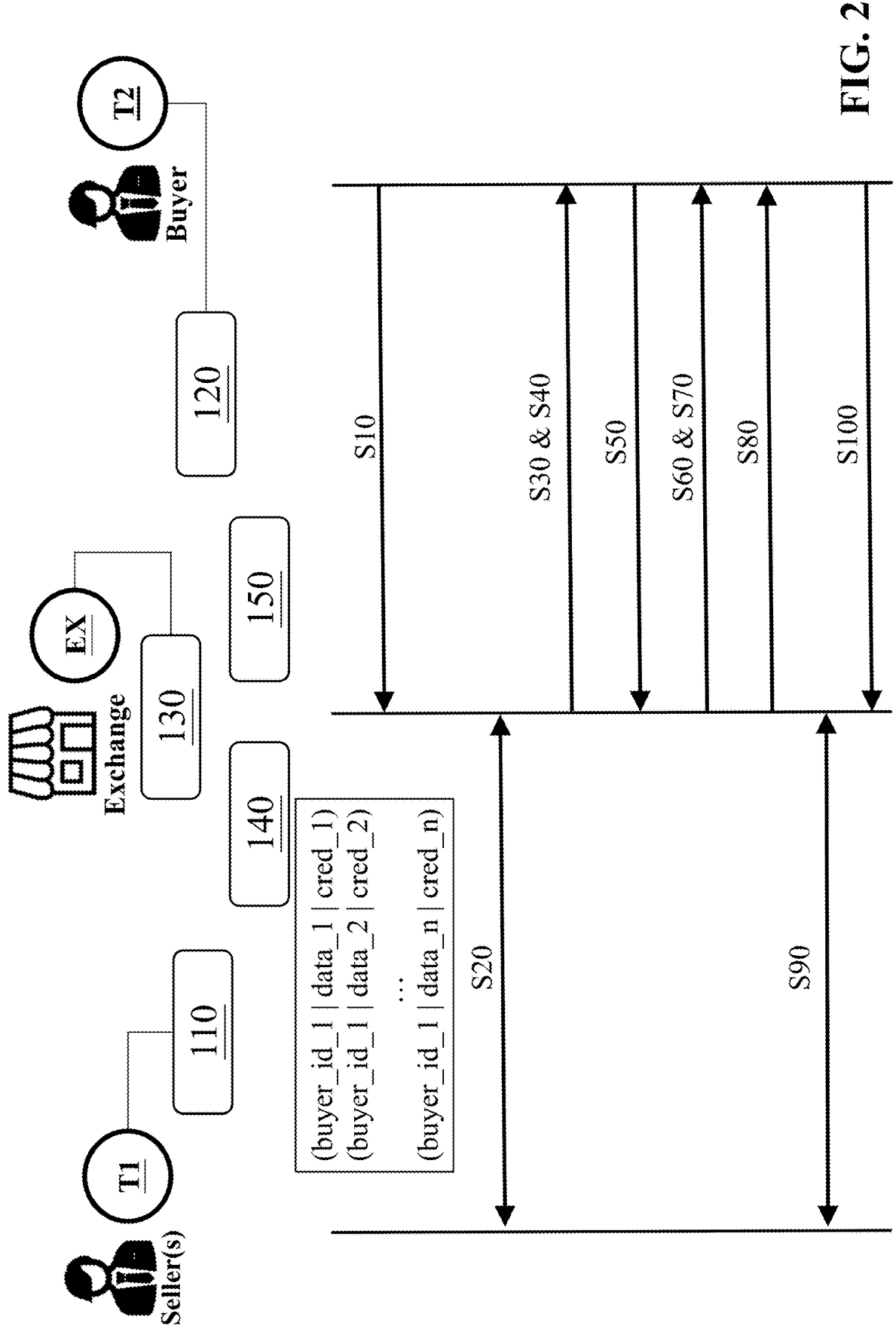
FIG. 2 depicts a schematic diagram of a seller, a buyer, and an exchange center interacting with each other in the system according to one embodiment of the present invention.

In the schematic diagram provided in FIG. 2, a seller, a buyer, and an exchange center interacting with each other in the system 100 are depicted. The seller is the data owner and uses the operatable interface at the owner terminal T1. The data owner module 110 is configured to receive user instructions from the owner terminal T1 and perform the corresponding functions. The buyer is a person or an entity seeking data listed for sale and uses the operatable interface at the user terminal T2. The data user module 120 is configured to receive user instructions from the user terminal T2 and perform the corresponding functions.

At the beginning, the seller and the buyer log into the exchange at the data exchange center EX. The seller uploads one or more data collections including one or more datasets to the exchange via the data owner module 110. As a non-limiting example, the datasets may include MRI (Magnetic Resonance Imaging) dataset. In one embodiment, in the uploading stage, the data owner module 110 encrypts a data collection of multiple datasets by using an encryption key, generates an identifier, a hash value, and a ciphertext of each of the datasets, and uploads the same to the data exchange module 130 at the data exchange center EX; for example, they are stored in a server of the data exchange module 130. The buyer views the listed information on the exchange dashboard and plans to submit an evaluation request as the buyer is interested to buy the data collection.

Then, the method for the interacting gets started, including steps S10, S20, S30, S40, S50, S60, S70, S80, S90, and S100.

In step S10, the buyer requests, via the data user module 120, to access and evaluate multiple datasets (e.g., data_1, ..., data_n) provided by the seller. In one embodiment, the buyer requests to access and evaluate multiple datasets provided by different sellers (i.e., a single request from the buyer is submitted for accessing and evaluating datasets of different sellers). The buyer's request is directed to the data owner module 110 in turn informing the seller via the data exchange module 130.

In step S20, the seller checks, via the data owner module 110, the request from the data user module 120 and determines whether to authorize the request, such as authorizing the buyer to access some or all of the datasets. This interaction is executed via the exchange at the data exchange center EX. In one embodiment, the number of the multiple datasets of the seller is M, the number of the datasets authorized for the buyer by the seller is N, where N and M are positive integer, and N is less than or equal to M. For example, the buyer requests for four datasets of the seller's data collection, and the seller only authorizes the three datasets of this data collection. In the illustration of FIG. 2, the label "buyer_id" is the user identity recognized by the exchange; the label "data_i" is the identifier of the datasets; and the label "cred_i" is a hash value of three elements: the hash value of the dataset "data_i" authorized by the seller, ciphertext of encryption key used to encrypt the dataset "data_i," a salt (a random number generated by data exchange center EX). Also, in one embodiment, the datasets of the data collection are encrypted by the data owner (i.e., the seller) using an encryption key; for example, the encryption key is encrypted using a public key from TEE (e.g., by the evaluation generator module 140) by the data owner.

In step S30 and step S40, the exchange creates and sends, via the data exchange module 130, a PCMA token to the data user module 120 for the buyer. The data exchange module 130 creates a PCMA token according to the buyer's requests and the seller's authorization.

Figure 3:
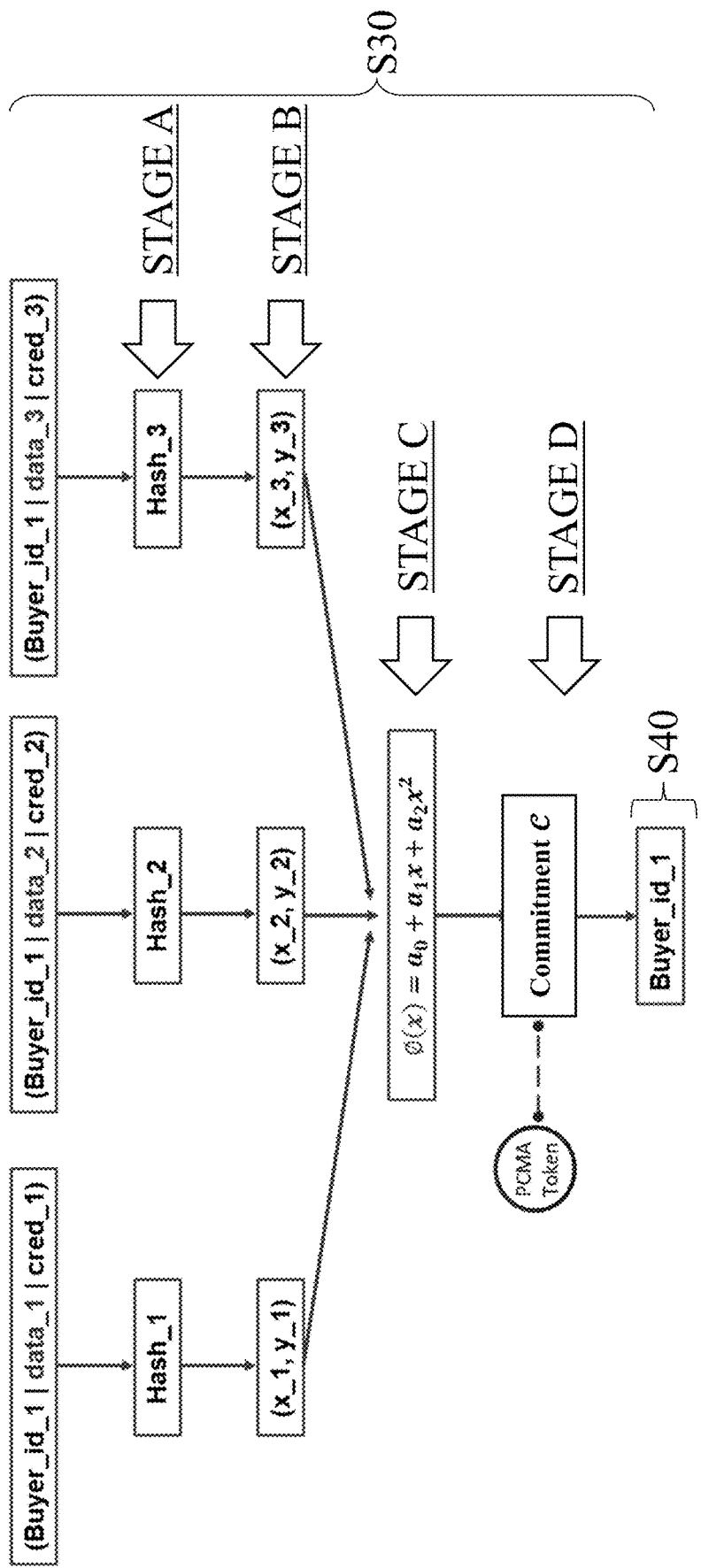
FIG. 3 depicts a flowchart of the generation of PCMA token according to one embodiment of the present invention.

Specifically, a flowchart shown in FIG. 3 illustrates an example of the generation of the PCMA token, assuming that the buyer (i.e., the label "Buyer_id_1") requests to access four datasets (i.e., the labels "data_1, data_2, data_3, data_4") and that the seller only authorizes the first three datasets (i.e., the labels "data_1, data_2, data_3"). The labels "(Buyer_id_1|data_1|cred_1)," "(Buyer_id_2|data_2|cred_2)," and "(Buyer_id_3|data_3|cred_3)" represent the authorized three datasets.

In stage A, hash values of the datasets are extracted. The label "Hash_i" is the hash value of (Buyer_id_1|data_i|cred_i), i=1, . . . , n. In this example, n=3. In stage B, each hash value "Hash_i" is mapped to a point (x_i, y_i), the labels "(x_1, y_1)," "(x_2, y_2)," and "(x_3, y_3)," on an elliptic curve. In stage C, a polynomial Ø(x) is generate based on the three points, by using Lagrange interpolation. In stage D, a commitment C is computed on the polynomial Ø(x) and it is set as a PCMA token, which is to be used for requesting data evaluation subsequently.

As such, the data exchange module generates the single PCMA token based on the user's identity (e.g., the label "Buyer_id_1"), which is registered in the data trading platform (i.e., the data exchange module 130), the identifiers of the datasets (e.g., the labels "data_1, data_2, data_3"), the hash values of the authorized datasets, and ciphertext of the encryption key which is used to encrypt the data collection.

By this configuration, the data exchange module 130 constructs the PCMA token using a polynomial commitment mechanism, which allows it to maintain a constant size regardless of the number of data authorizations it represents, thereby facilitating a compact (e.g., less than or equal to about 300 bytes) representation of multiple (e.g., hundreds or more) authorizations. Further, the data exchange module 130 leverages a commitment algorithm of the polynomial commitment mechanism as a cryptographic protocol for the PCMA token, so as to ensure that any potentially sensitive raw information used to construct the PCMA token is free from feasibly deriving from it, enabling its public usage and storage while still safeguarding data privacy.

In one embodiment, the PCMA token is non-fungible (e.g., a non-fungible token; NFT) and thus it is public to Web3 users. For example, the PCMA token is recorded on the blockchain by the data exchange module 130, making its related information public, such that anyone (e.g., any exchange user) is able to view its status and history via the Internet.

Thereafter, the PCMA token is sent/returned to the buyer, (Buyer_id_1), via the data exchange module 130 and the data user module 120.

Figure 4:
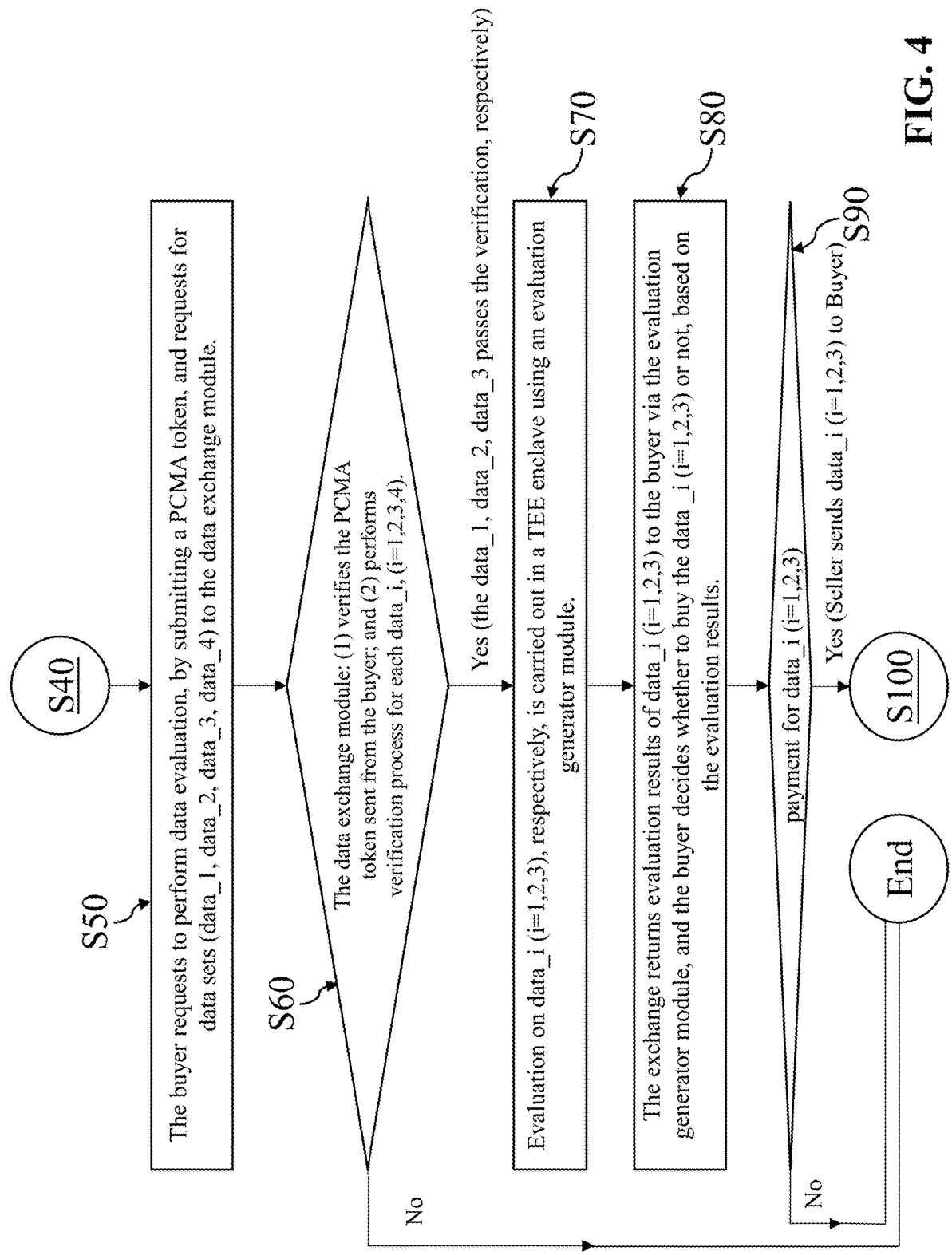
FIG. 4 depicts a flowchart of the detailed operations of steps S50, S60, S70, S80, and S90 for data verification and evaluation according to one embodiment of the present invention.

Referring to FIG. 2 and FIG. 4, in which FIG. 4 shows a flowchart of the detailed operations of steps S50, S60, S70, S80, and S90 for data verification and evaluation, in accordance with one embodiment of the present invention.

In step S50, the buyer requests, via the data user module 120, to perform data evaluation. In one embodiment, the buyer asks for at least one evaluation result of the datasets via the data user module 120, by submitting the single PCMA token (i.e., the computed commitment $C$) and identities of the datasets (e.g., "data_1, data_2, data_3, data_4") to the data exchange module 130. In this example, the identity of the dataset "data_4" is submitted by the buyer, but it has not been authorized by the seller.

In step S60, the data exchange module 130 verifies each queried dataset with the PCMA token in response to the data user module 120. Specifically, the data exchange module 130 verifies the PCMA token (i.e., the computed commitment C) sent from the buyer and then performs a verification process for each data_i, (i=1,2,3,4). Next, since points generated from the datasets "data_i (i=1,2,3)" belong to the polynomial Ø(x), they can pass the verification. On the contrary, as the dataset "data_4" is not authorized by the data owner module 110 in the previous step, the generated point (x_4, y_4) of the dataset "data_4" is not on polynomial Ø(x), thereby failing the verification. In one embodiment, once all datasets are not authorized, resulting in no point on polynomial Ø(x), the verification entirely fails and the process is aborted.

Figure 5:
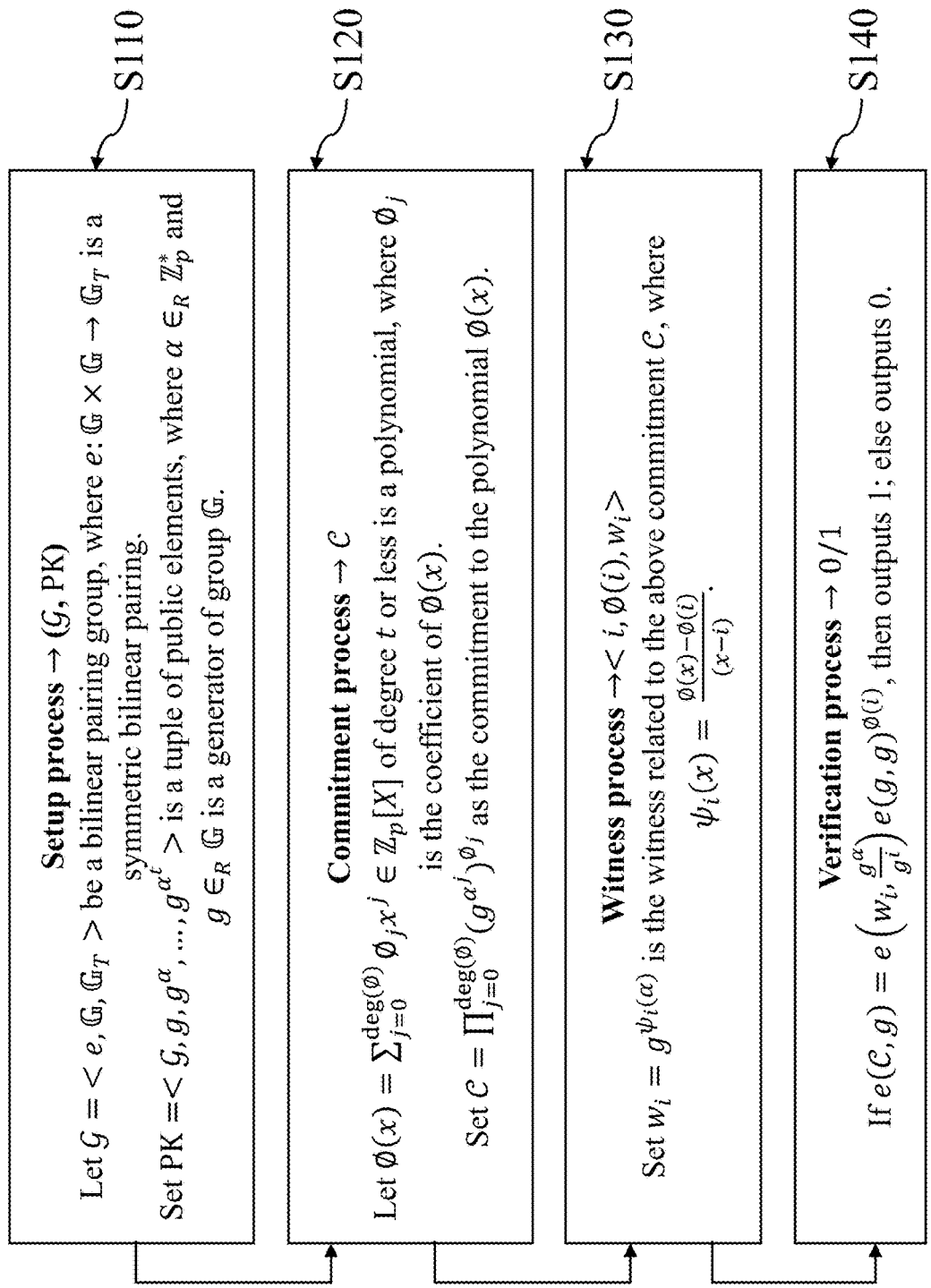
FIG. 5 depicts a flowchart of the polynomial commitment process in the data verification by a data exchange module according to one embodiment of the present invention.

A process of generating polynomial commitment for the verification by the data exchange module 130 is illustrated in FIG. 5. The illustration gives an example of how to generate a commitment based on a given polynomial and how to perform verification by the data exchange module 130, including steps S110, S120, S130, and S140.

Step S110 is a setup process step for ($\mathcal{G}$, , PK), generated by the data exchange module 130, where ($\mathcal{G}$, , PK) is public. Step S120 is a commitment process step for $\mathcal{C}$, executed by the data exchange module 130, where $\mathcal{C}$ is public and sent to the data user module 120 for the buyer. Step S130 is a witness process step for <i, Ø(i), $w_i$>, executed by the data exchange module 130, where <i, Ø(i), $w_i$> is public. Also, the data exchange module 130 records the buyer's request as the label (Buyer_id_1, (data_i, cred_i), $\mathcal{C}$).

Step S140 is a verification process step for outputting a result signal. It is executed by the data exchange module 130, where outputting "1" means verification succeeded and authorization is approved; outputting "0" means verification failed and authorization is declined.

Referring to FIG. 2 and FIG. 4 again. As the result of step S60 being "Yes" and the datasets, "data_1, data_2, data_3," having passed the verification, the datasets are fed to an evaluation process in step S70. The evaluation generator module 140 performs an evaluation process for each of the authorized datasets within the TEE enclave once the PCMA token submitted from the data user module is successfully verified by the data exchange module 130 (i.e., passing the verification).

In one embodiment, during the evaluation process, data content of the datasets is evaluated using a jointly-accepted data evaluation process (jointly-accepted by the buyer, the seller, and the exchange) within the TEE enclave. The evaluation generator module may have an algorithm or an AI model combined with the evaluation process, allowing the jointly-accepted data evaluation process to execute based on the algorithm or the AI model. In some practical cases, the jointly-accepted evaluation process may be a real-life proven process, such as quality control for medical images, natural language detection for language data, or similar application. In one embodiment, the evaluation generator module 140 executes the evaluation process according to an executability protocol, whereby signed executables of the evaluation process are permitted to evaluate the authorized datasets within the TEE enclave, but unsigned executables of the evaluation process are forbidden from evaluating the authorized datasets within the TEE enclave, thereby protecting the privacy of the data products in the TEE enclave.

In various embodiments, the TEE enclave of the evaluation generator module 140 is operated by the seller via the data owner module 110 or by the exchange via the data exchange module 130. More specifically, at the beginning step, the dataset with identifier data_i is encrypted by the seller using key "datakey_i". Then, upon the PCMA token verification, within the TEE enclave, the key "datakey_i" is used to decrypt the encrypted dataset, and a jointly-accepted evaluation process is performed on the decrypted dataset. There are two approaches for this. In one embodiment, the seller chooses to set up its own TEE enclave (i.e., the TEE enclave of the evaluation generator module 140 is operated by the seller), so that neither the exchange nor the buyer is able to access the raw data_in the decrypted dataset of data_i. In an alternative embodiment, the seller chooses to entrust the exchange to host the data evaluation service (i.e., the TEE enclave of the evaluation generator module 140 is operated by the exchange) for the dataset of data_i by sending to the exchange the ciphertext of the key "datakey_i," encrypted using the TEE enclave's public key "datakey_i."

As such, the TEE condition ensures only the evaluation results are to be returned from the TEE enclave, but the raw data_inside the TEE enclave is never revealed to untrusted parties, thereby protecting seller's data.

In step S80, the evaluation generator module 140 sends the evaluation result for each of the authorized datasets to the data user module 120 from its TEE enclave, meaning the buyer receives the result from the exchange. After that, the buyer can decide whether to buy the datasets from the seller according to the evaluation results generated by the jointly-accepted evaluation algorithm.

In step S90, if the buyer decides to pay for the datasets, a corresponding message is sent to the seller from the buyer via the exchange. In one embodiment, the data owner module 110 and the data user module 120 are collectively configured to construct a communication path from the owner terminal T1 to the user terminal T2 via the data exchange center EX, provided for data transmission from the owner terminal T1 to the user terminal T2 and for payment from the user terminal T2 to the owner terminal T1.

The seller sends datasets (e.g., "data_1, data_2, data_3") upon receiving the payment from the buyer, which match data hash compliant with the PCMA token. In one embodiment, the exchange uses the data exchange module 130 as an intermediary platform that enables sellers and buyers to automatically complete their transactions. Once the buyer decides to reject the payment, the transaction fails, and the process is aborted.

In step S100, after receiving the purchased data collection, the buyer optionally activates data certification. In one embodiment, the data certification is created via smart contracts deployed by the exchange or another designated third party. For example, the data certification module 150 is provided by the exchange and it is encompassed in the system 100.

Figure 6:
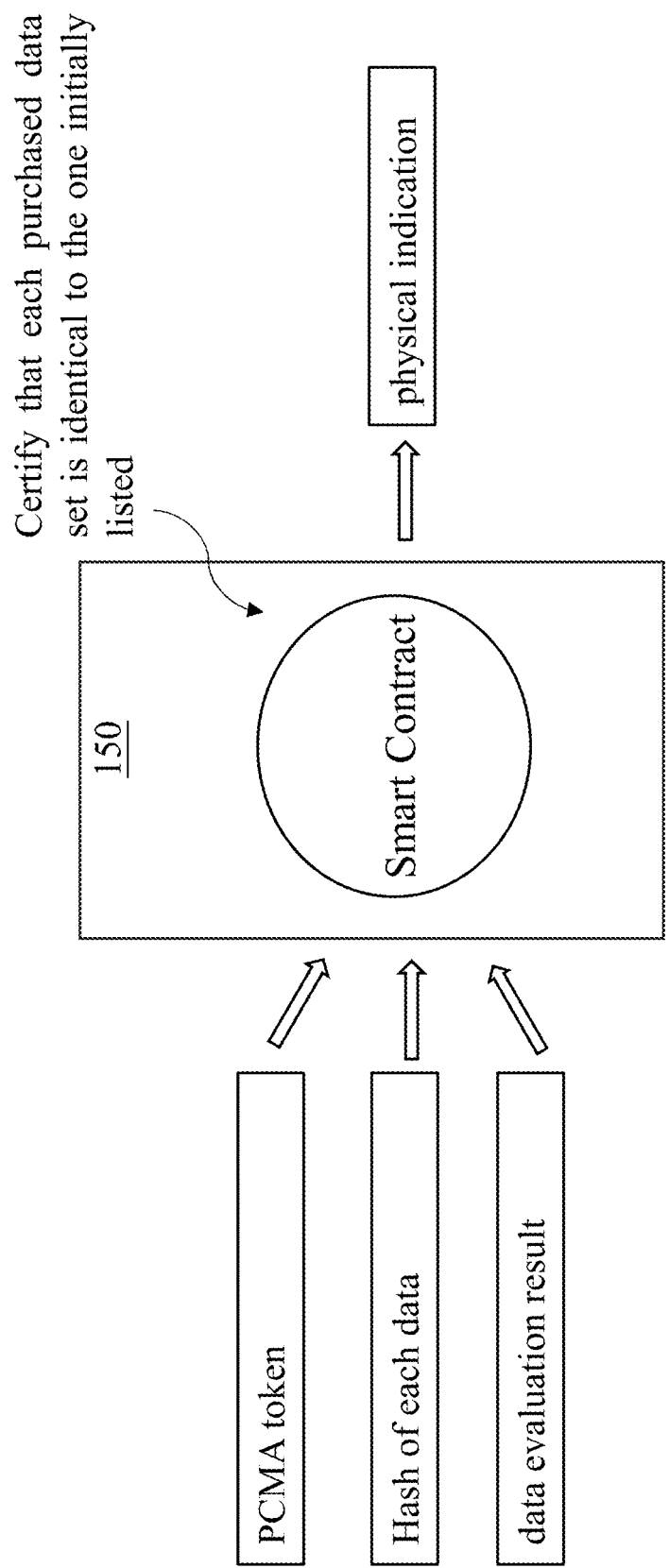
FIG. 6 depicts a schematic diagram of a data certification module performing a data certification via deployed smart contracts, according to one embodiment of the present invention.

As shown in FIG. 6, the data certification module 150 performs data certification via the deployed smart contracts. The data certification module 150 obtains the PCMA token, the hash values of the purchased datasets, and at least one evaluation score of the evaluation result and takes them as input sources. During the data certification, the data certification module 150 constructs a point on an elliptic curve for each obtained/input dataset and then verifies that all the points belong to a polynomial represented by the obtained/input single PCMA token. The data certification is executed in a TEE enclave and aims to certify/evaluate that each purchased dataset is identical to the one initially listed by the seller.

In one embodiment, the data certification module 150 outputs a positive signal only if the bash values of the datasets are identical to those provided by the data owner module 110 from the data owner terminal T1 and all the points are in the polynomial represented by the single PCMA token, indicating that the buyer receives the same data content as evaluated by the TEE enclave in the previous steps. In another embodiment, the data certification module 150 outputs a negative signal if the hash values of the datasets differ from those provided by the data owner module 110 from the data owner terminal T1 as initially listed. The signal provided by the data certification module 150 serves as an indicator to the buyer on whether the transaction is proceeding as expected.

Figure 7:
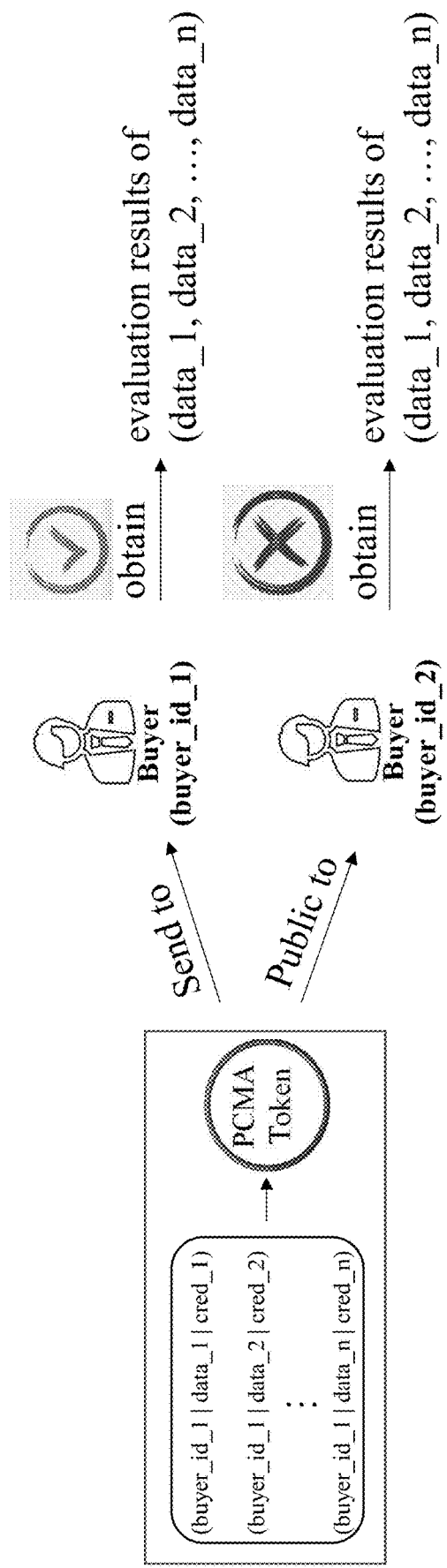
FIG. 7 depicts a schematic drawing illustrating how to detect and decline a buyer's request with a wrong or stolen token using the system according to one embodiment of the present invention.

FIG. 7 depicts a schematic drawing of how to detect and decline a buyer's request with a wrong or stolen token using the system 100 according to one embodiment of the present invention. As afore-described, the data exchange module 130 constructs a point on an elliptic curve using a requester's identity (e.g., real buyer or other speculators) and validates whether the point lies on the polynomial represented by the provided PCMA token. As the PCMA token (i.e., the commitment C) embeds the authorized identity as the label "Buyer_id_1", rather than the label "Buyer_id_2", the request by the wrong user (i.e., the buyer with the label "Buyer_id_2") is detected and rejected.

Figure 8:
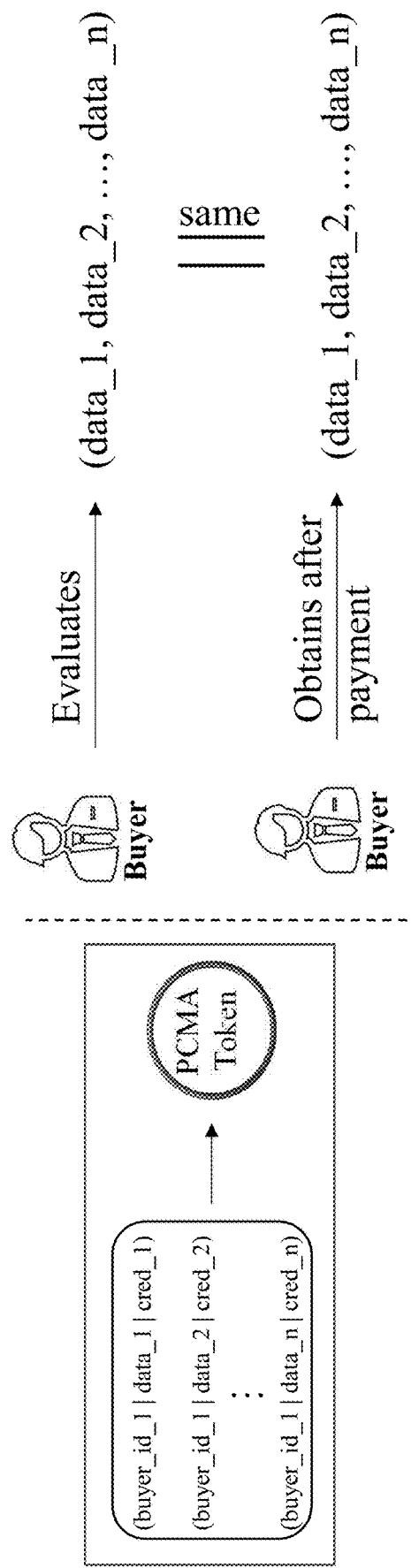
FIG. 8 depicts a schematic drawing illustrating how to ensure that the sent data is the same as the evaluated data, once Buyer's payment is made, according to one embodiment of the present invention.

FIG. 8 depicts a schematic drawing illustrating how to ensure that the sent data is the same as the evaluated data, once Buyer's payment is made, according to one embodiment of the present invention. As afore-described, the PCMA token includes the identifier of the dataset, and its hash value. If the seller delivers a different dataset after the buyer's payment, the data hash value would not be compliant and would not pass verification with the PCMA token. The verification process can be automated using a smart contract deployed by the system 100.

By this configuration, the system of the present invention provides the construction of a single, constant-size, publicly revealable PCMA token to represent authorizations for multiple protected datasets, thereby building a trusted authorization mechanism between the data buyer, seller, and exchange. Further, the system builds a trusted data product evaluation coordination mechanism using TEE, to grant jointly accepted evaluations for multiple protected datasets while preserving data privacy. Moreover, the system enables automated, systematic data transaction integrity certification of multiple returned datasets via smart contracts and a single PCMA token.

The present disclosure provides a simple example to demonstrate the generation of the PCMA token. However, in other embodiments of the present invention, the provided technique supports authorization to multiple datasets, as long as the resulting coefficients of polynomial can be represented in $Z_p^*$, where p is a large prime.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes executing in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can be included, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system using trusted authorization mechanism based on polynomial commitment multiple access (PCMA) for data exchange, comprising:
   a data owner module electrically or wirelessly coupled for data communication with an owner terminal and configured to encrypt a data collection comprising multiple datasets of the owner terminal by using an encryption key and to generate an identifier and a hash value for each of the datasets;
   a data user module electrically or wirelessly coupled for data communication with a user terminal and configured to submit at least one request from the user terminal to the data owner module for evaluating the datasets, wherein the data owner module is further configured to check the request from the data user module, authorizing at least one of the datasets of the data collection or rejecting any request without authorizing any one of the requested datasets of the data collection; and
   a data exchange module electrically or wirelessly coupled for data communication with a data exchange center and configured to generate a single PCMA token based on the user's identity, which is registered in the data exchange module, the identifiers of the datasets, and the hash values of the authorized datasets, wherein the data exchange module constructs the PCMA token using a polynomial commitment mechanism, which allows it to maintain a constant size regardless of the number of data authorizations it represents, and wherein the data exchange module leverages a commitment algorithm of the polynomial commitment mechanism as a cryptographic protocol for the PCMA token, so as to ensure that any potentially sensitive raw information used to construct the PCMA token is free from feasibly deriving from it;
   wherein the data exchange module is further configured to send the PCMA token to the data user module for submission by the user terminal when requesting for data evaluation.

2. The system according to claim 1, wherein the data user module is configured to submit the PCMA token and identities of the datasets to the data exchange module for asking for at least one evaluation result, and the data exchange module is configured to verify each queried dataset with the PCMA token in response to asking from the data user module.

3. The system according to claim 2, further comprising an evaluation generator module configured to provide a trusted executed environment (TEE) enclave and perform an evaluation process for each of the authorized datasets within the TEE enclave once the PCMA token submitted from the data user module is successfully verified by the data exchange module, wherein the evaluation generator module is further configured to send the evaluation result for each of the authorized datasets to the data user module.

4. The system according to claim 3, wherein the evaluation generator module has an algorithm or an AI model combined with the evaluation process.

5. The system according to claim 3, wherein the evaluation generator module performs the evaluation process according to an executability protocol, such that signed executables of the evaluation process are permitted for evaluating the authorized datasets within the TEE enclave and that unsigned executables of the evaluation process are forbidden from evaluating the authorized datasets within the TEE enclave.

6. The system according to claim 3, wherein the data owner module and the data user module are collectively configured to construct a communication path from the owner terminal to the user terminal for data transmission from the owner terminal to the user terminal and for payment from the user terminal to the owner terminal.

7. The system according to claim 6, further comprising a data certification module configured to deploy smart contracts and obtain the PCMA token, the hash values of the datasets from the user terminal, and at least one evaluation score of the evaluation result as input thereof, wherein the data certification module performs a data certification program by:
   constructing one point on an elliptic curve for each authorized dataset; and
   verifying that all the points belong to a polynomial represented by the single PCMA token.

8. The system according to claim 7, wherein the data certification module outputs a positive signal, only if the hash values of the datasets are identical to those provided by the data owner module from the data owner terminal and all the points are in the polynomial represented by the single PCMA token.

9. The system according to claim 7, wherein the data certification module outputs a negative signal if the hash values of the datasets are different from those provided by the data owner module from the data owner terminal.

10. The system according to claim 1, wherein the number of the requested multiple datasets is M, the number of the authorized datasets for the user terminal is N less than or equal to M, where N and M are positive integer.

11. A method using trusted authorization mechanism based on polynomial commitment multiple access (PCMA) for data exchange, comprising:
- encrypting, by a data owner module, a data collection comprising multiple datasets of an owner terminal by using an encryption key;
- generating, by the data owner module, an identifier and a hash value for each of the datasets;
- submitting, by a data user module, at least one request from a user terminal to the data owner module for evaluating the datasets;
- checking, by the data owner module, the request from the data user module and authorizing, by the data owner module, at least one of the datasets of the data collection, or rejecting, by the data owner module, any request without authorizing any one of the requested datasets of the data collection;
- generating, by a data exchange module, a single PCMA token based on the user terminal's identity, the identifiers of the datasets, and the hash values of the authorized datasets;
- constructing, by the data exchange module, the PCMA token using a polynomial commitment mechanism, which allows it to maintain a constant size regardless of the number of data authorizations it represents, wherein the data exchange module leverages a commitment algorithm of the polynomial commitment mechanism as a cryptographic protocol for the PCMA token, so as to ensure that any potentially sensitive raw information used to construct the PCMA token is free from feasibly deriving from it; and
- sending, by the data exchange module, the PCMA token to the data user module for submission by the user terminal when requesting for data evaluation.

12. The method according to claim 11, further comprising:
- submitting, by the data user module, the PCMA token and identities of the datasets to the data exchange module for asking for at least one evaluation result; and
- verifying, by the data exchange module, each queried dataset with the PCMA token in response to asking from the data user module.

13. The method according to claim 12, further comprising:
- providing, by an evaluation generator module, a trusted executed environment (TEE) enclave;
- performing, by the evaluation generator module, an evaluation process for each of the authorized datasets within the TEE enclave once the PCMA token submitted from the data user module is successfully verified by the data exchange module; and
- sending, by the evaluation generator module, the evaluation result for each of the authorized datasets to the data user module.

14. The method according to claim 13, wherein the evaluation generator module has an algorithm or an AI model combined with the evaluation process.

15. The method according to claim 13, wherein the evaluation generator module performs the evaluation process according to an executability protocol, such that signed executables of the evaluation process are permitted for evaluating the authorized datasets within the TEE enclave and that unsigned executables of the evaluation process are forbidden from evaluating the authorized datasets within the TEE enclave.

16. The method according to claim 13, further comprising:
- constructing, by the data owner module and the data user module collectively, a communication path from the owner terminal to the user terminal via the data exchange center, provided for data transmission from the owner terminal to the user terminal and for payment from the user terminal to the owner terminal.

17. The method according to claim 16, further comprising:
- deploying, by a data certification module, smart contract;
- obtaining, by the data certification module, the PCMA token, the hash values of the datasets from the user terminal, and at least one evaluation score of the evaluation result as input thereof, wherein the data certification module performs a data certification program by:
  - constructing one point on an elliptic curve for each authorized dataset; and
  - verifying that all the points belong to a polynomial represented by the single PCMA token.

18. The method according to claim 17, further comprising:
- outputting a positive signal, only if the hash values of the datasets are identical to those provided by the data owner module from the data owner terminal and all the points are in the polynomial represented by the single PCMA token.

19. The method according to claim 17, further comprising:
- outputting a negative signal if the hash values of the datasets are different from those provided by the data owner module from the data owner terminal.

20. The method according to claim 11, wherein the number of the requested multiple datasets is M, the number of the authorized datasets for the user terminal is N less than or equal to M, where N and M are positive integer.

* * * * *